April 16, 1968 D. R. SAND 3,377,875

CHAIN DRIVE POWER TRANSMITTING MECHANISM

Filed May 9, 1966 3 Sheets-Sheet 1

INVENTOR.
Darrel R. Sand
BY
Robert L. Spencer
ATTORNEY

April 16, 1968 D. R. SAND 3,377,875

CHAIN DRIVE POWER TRANSMITTING MECHANISM

Filed May 9, 1966 3 Sheets-Sheet 2

INVENTOR.

Darrel R. Sand

BY

Robert L. Spencer

ATTORNEY

INVENTOR.
Darrel R. Sand
BY
Robert L. Spencer
ATTORNEY

United States Patent Office 3,377,875

Patented Apr. 16, 1968

1

3,377,875
CHAIN DRIVE POWER TRANSMITTING MECHANISM

Darrel R. Sand, Plymouth, Mich., assignor to General Motors Corporation, Detroit, Mich., a corporation of Delaware Filed May 9, 1966, Ser. No. 548,480
14 Claims. (Cl. 74—229)

This invention relates to a chain drive and more particularly to an improved chain drive particularly adapted for use in applications where permissible allowable noise levels and chain life are critical. One such application is in automotive use where the chain is utilized in the vehicle drive train. In such an application, if the chain noise is excessive or chain life of insufficient length the chain cannot, as a practical matter, be employed.

Use of conventional chain drives in automotive drive trains has been found by actual application in automotive vehicles to be impractical particularly because such conventional chains develop excessive unacceptable noise levels and also because of relatively short useful life. While it is possible to increase the chain life of a conventional chain by increasing the chain width, this is undesirable because of cost and because this merely increases the noise developed in the chain.

The present invention permits the use of a relatively narrow chain, increases chain life and greatly reduces the chain noise level, thus making the use of a chain drive in an automotive vehicle acceptable and practical.

An object of this invention is to provide a chain and sprocket drive which is relatively quiet, which has a long useful life and which is capable of handling relatively large torques so as to be practical for use in automotive drives for driving automotive vehicles.

Another object of this invention is to provide a chain and sprocket drive wherein the chain pitch is greater than the pitch normally used in chain and sprocket designs such that the chain length between the sprockets is greater than the sprocket center distance.

A further object is to provide in a chain drive, sprockets wherein the circular pitch of the sprocket is greater than the oversized chain pitch employed to relieve excess tension in the chain in the space between the sprockets.

An additional object of this invention is to provide a mismatch of the chain pitch and sprocket pitch such that the real operating pitch of the sprocket is greater than the real operating pitch of the chain to correct for interference action between the sprocket teeth and chain teeth at entrance to and leaving the sprocket. This forces the chain teeth outwardly with respect to the sprocket teeth such that the chain rides on the sprocket at a pitch diameter greater than the normal theoretical pitch diameter at which chains and sprockets having matched chain pitch and sprocket circular pitch ride.

Another object of this invention is to provide a chain and sprocket drive having improved meshing action by providing a sprocket tooth pressure angle less than the pressure angle of the chain.

Another object of this invention is to provide a chain and sprocket drive wherein the base pitch in the sprocket is greater than the base pitch of the chain.

A further object of this invention is to provide a chain and sprocket drive incorporating root guiding or root contact to reduce noise, increase chain life and to make possible a greater mismatch of the sprocket base pitch or circular pitch and the chain base pitch than is possible when using conventional roll or flank dimension guiding of the chain and sprocket teeth and to make possible random tooth flank contact and random root guide.

An additional object of this invention is to provide in

2 a chain and sprocket drive a hub and sprocket arrangement wherein the sprocket is movable angularly relative to the hub and to provide a torsional damper between the hub and sprocket for isolating the sprocket tooth engagement pulses which otherwise would excite the members of the sprocket mounting system with critical resonant frequencies and produce undesirable noise.

A still further object of this invention is to provide a hub and sprocket having coacting splines and wherein there is provided an isolating device for torsional damping and wherein the hub is provided with a raised bearing surface for supporting the hub and wherein the splines and isolating device are disposed in spaced relationship at opposite sides of the bearing surface.

Another object of this invention is to provide a link chain and sprocket combination of the type described wherein at least one of the sprockets has a majority of the teeth cut off to provide a majority of short teeth of reduced length such that the flanks of the short sprocket teeth are out of contact with the flanks of the chain teeth during rolling action of the chain on the sprocket and wherein the flanks of the short teeth contact the flanks of the chain teeth upon cessation of rolling action of the chain on the sprocket and to provide a minor number of teeth of normal length for coacting with the chain teeth. This construction prevents any contact or any flank contact shock from being introduced into the system by the random positioned intermediate size teeth.

An additional object of this invention is to provide a chain and sprocket arrangement of the type described wherein at least one of the sprockets is provided with a plurality of full sized sprocket teeth spaced from each other at random and is provided with sprocket teeth intermediate the full sized teeth having the flanks of such intermediate teeth reduced from normal size such that the flanks of the chain teeth are spaced from the flanks of the intermediate sprocket teeth during rocking action of the chain relative to the sprocket and the tips of the chain teeth contact the roots of the intermediate sprocket teeth during rocking motion of the chain relative to the sprocket, and the flanks of the chain teeth contact the flanks of the chain and intermediate sprocket teeth are in contact when the rocking motion of the chain relative to sprocket ceases.

A further object of this invention is to provide a chain and sprocket drive of the type described wherein at least one sprocket is provided with full sized teeth spaced at random with respect to each other and is provided with teeth intermediate the full sized teeth which are inactive during rocking motion of the chain on the sprocket, the inactive teeth intermediate the full sized teeth having one flank shaved away and also having a root of reduced diameter extending from the base of the flank of reduced size to one flank of full size on the next adjacent tooth.

Random positioning of intermediate size teeth and/or random tooth guide constitute means for breaking up and preventing the normal basic frequency normally induced by a full complement of identically shaped sprocket teeth provided with conventional flank guide. The random positioning of intermediate size teeth and/or random tooth guide arrangements induce strong impulses at frequencies other than the pure sprocket tooth frequencies, thereby counteracting the tendency of resonant frequencies to arise.

These and other objects and advantages of this invention will be apparent from the following description and claims, taken in conjunction with the accompanying drawings, in which:

Figure 1:
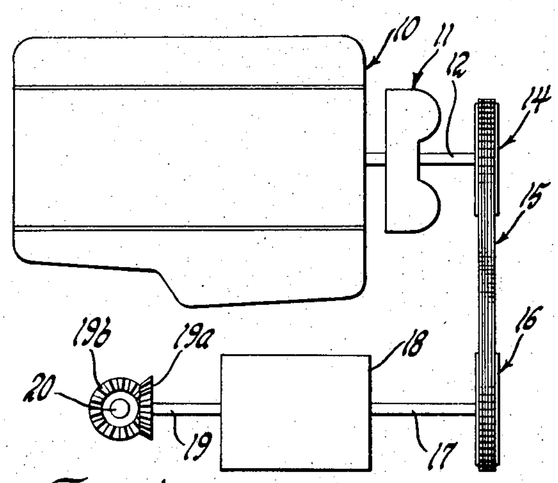
FIGURE 1 is a schematic diagram illustrating a vehicle engine and transmission disposed in parallel relationship and incorporating a chain and sprocket arrangement incorporating the principles of this invention for delivering torque from the engine to the transmission.

Referring to FIGURE 1, there is shown an engine and transmission assembly embodying the chain drive of the present invention.

An engine 10 drives a conventional hydrodynamic torque-transmitting device 11 which may be a fluid coupling or torque converter and is preferably a torque converter. The converter output shaft 12 drives a sprocket generally indicated at 14. A chain 15 driven by sprocket 14 transmits torque to a sprocket 16 to drive an automatic transmission 18. The transmission 18 is of conventional design and may drive the vehicle wheels (not shown) through a shaft 19 and gears **19*a* and 19*b* and a cross shaft 20**.

Figure 2:
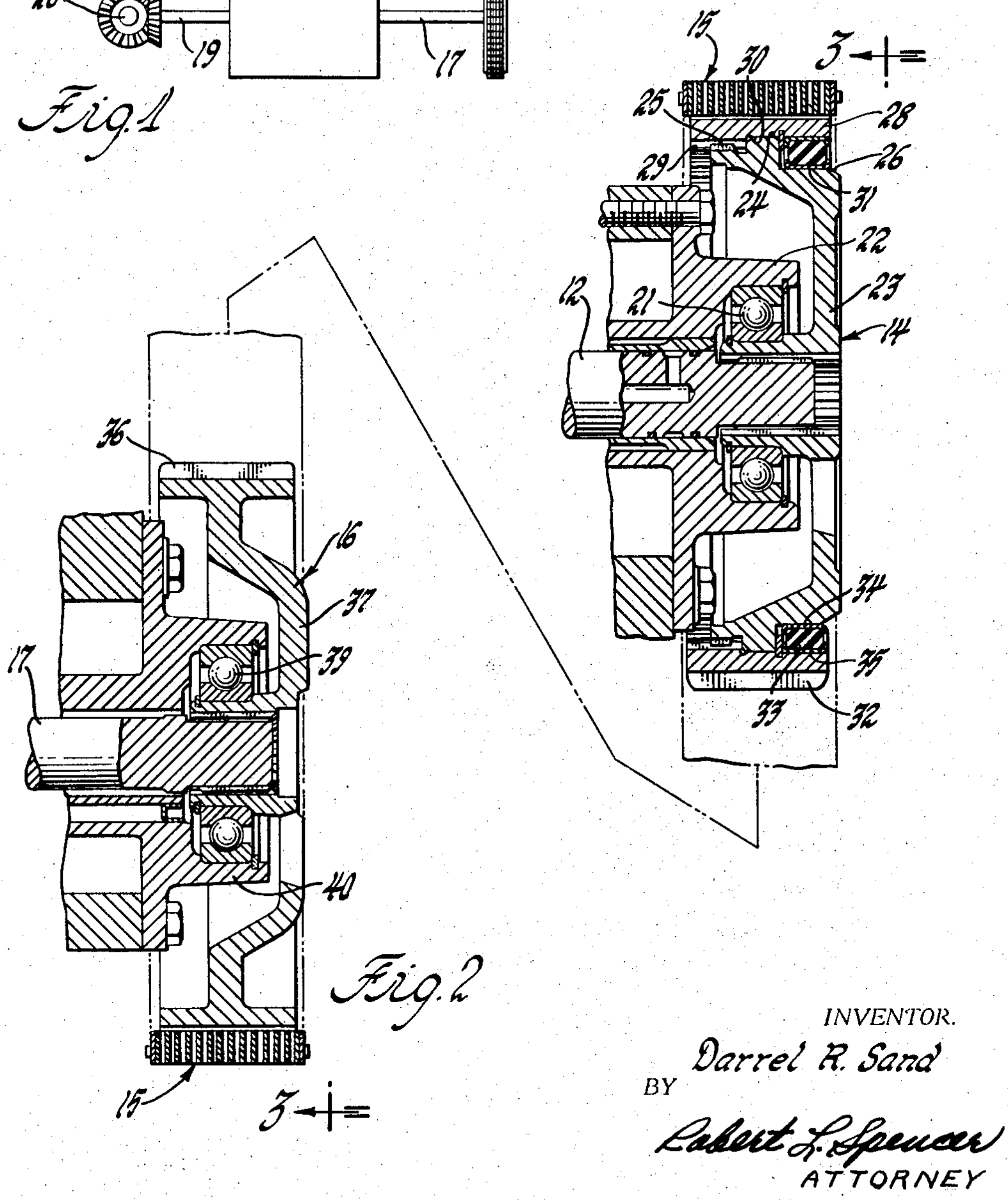
FIGURE 2 is a sectional view illustrating the details of the support mounting of the drive and driven sprockets.

Referring to FIGURE 2, the power delivery shaft 12 of torque converter 11 drives a sprocket hub 23 splined on shaft 12 and supported for rotation in a bearing 21 disposed between hub 23 and a support housing 22. A raised annular bearing surface 24, splines 25, and a recess 26 are formed on hub 23. A sprocket or gear 28 is formed with splines 29 which mate with splines 25 and a bearing surface 30 coacting with bearing surface 24, the sprocket member 28 extending axially over recess 26 to receive a torsional dampener 31. Sprocket 28 carries sprocket teeth 32. A chain 15 mates with teeth 32. Torsion damper 31 comprises an annular rubber ring 33 carried in split annular metal housing 34–35. The ring and housing are press-fitted in recess 26 to firmly grip the sprocket 28 and hub 23. The resilient ring normally biases the splines 25 and 29 out of contact with each other when no torque is delivered to shaft 12. Under torque loading the resilient ring will yield, permitting hub 23 to rotate relative to sprocket 28 to permit metal-to-metal contact of splines 25, 29. The bearing surfaces 24–30 between the splines 25 and torsion damper device 31 support the gear on the hub and permit limited angular rotation of the hub 23 and sprocket 28.

Chain 15 mates with teeth 36 of a driven sprocket indicated generally at 16 having a hub 37 splined to a transmission power input shaft 17. A ball bearing 39 supports hub 37 for rotation in a support housing 40.

Figure 3:
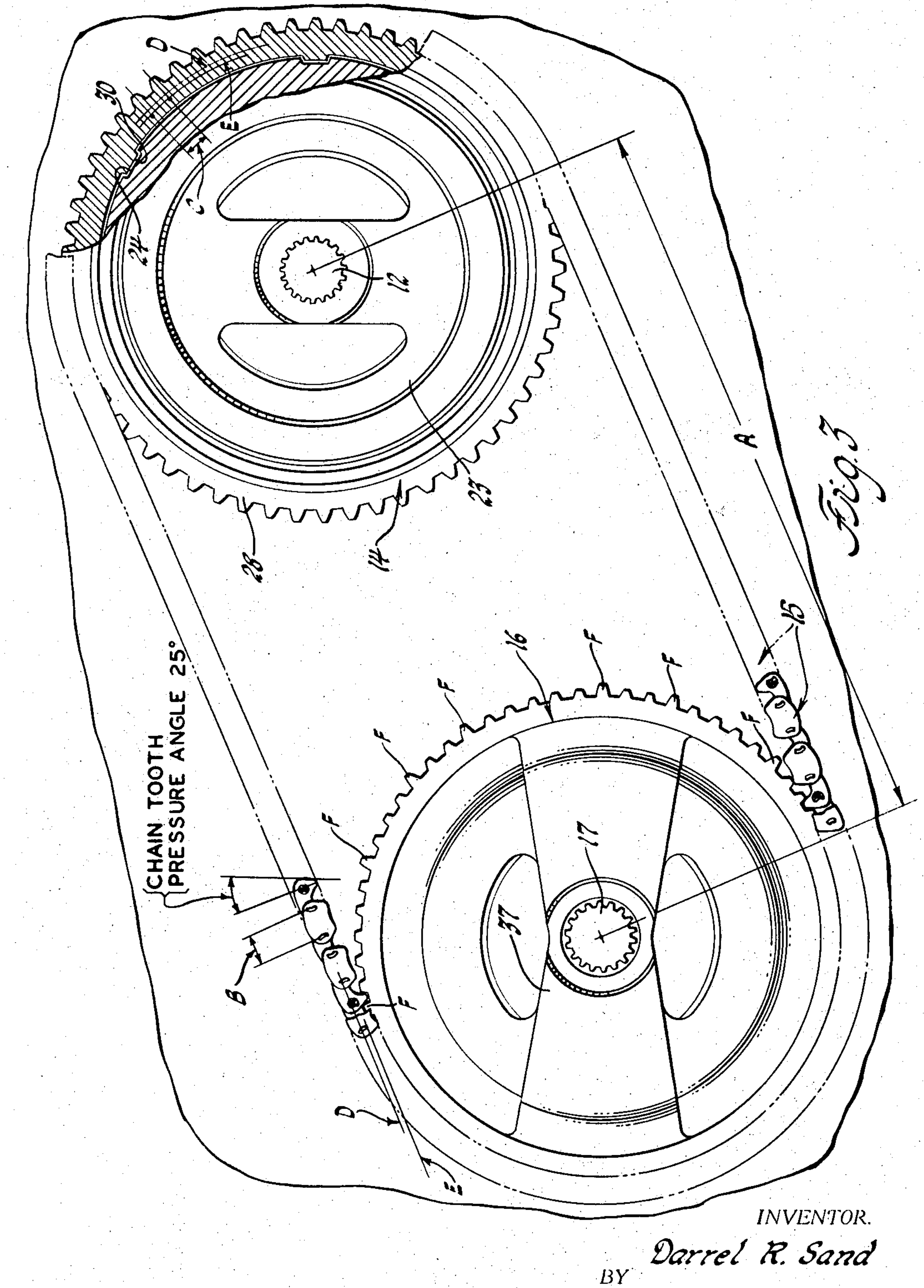
FIGURE 3 is a view taken along the line 3—3 of FIGURE 2 further illustrating details of the drive and driven sprockets.

Referring to FIGURE 3, there is shown the drive sprocket 14 and driven sprocket 16 and chain 15. The drive and driven sprockets are spaced a fixed sprocket distance A between their axes of rotation. Each sprocket is provided with 65 teeth. The chain has a linear chain pitch B. The sprocket has a sprocket base pitch C. The actual chain pitch line or operating pitch is indicated at D. The normal theoretical chain pitch line or operating pitch for perfectly matched teeth is indicated at E.

In normal chain design it is conventional practice to match the chain pitch to the sprocket center distance to perfectly match the chain to the sprocket. For example, if the sprocket center distance A is assumed to be $11/16$ inch and 29.5 chain links are used to extend the sprocket center distance, the normal and theoretically proper chain pitch B would, by conventional practice, be $11/16$ divided by 29.5 or .375 in order to perfectly match the chain to the sprocket.

The improved chain herein is designed to provide a mismatch between the chain and sprocket such that the actual operating pitch of the chain and sprocket will be greater than the operating pitch of a chain and sprocket of conventional design wherein the chain pitch is selected for perfect matching of the chain and sprocket teeth. Chain 15 is designed such that the chain pitch B is greater than the chain pitch of a conventional chain design required for perfect matching to the sprocket. The chain length between sprocket centers is thus increased to a distance greater than the sprocket center distance. For example, still using the same number of chain lengths normally used to cover the given sprocket center distance for perfect sprocket and chain tooth matching, the chain pitch is made greater than the pitch required for perfect matching of chain and sprocket. Thus, in the example given where the normal theoretical chain pitch for perfect matching is .375, the chain pitch is increased to a greater than normal theoretically proper pitch, for example, to .3752. The chain length between sprocket centers thus is made greater than the sprocket center distance. The chain wraps on the sprocket drive teeth on an active semicircle of contact with the sprocket. The chain in static condition is loose between the sprockets, but tight on the sprocket.

The base pitch C of the sprocket is altered from normal design by making the base pitch longer than the oversized pitch of the chain to prevent sudden shock contact between the sprocket tooth face and excess tension in the chain in the space between the sprockets, the chain tooth flank thereby improving meshing action between the sprockets. If the pitch of the chain is increased from .375 to .3752, the base pitch of the sprocket may be increased to .3756, by way of example. There is thus provided a pitch mismatch between the real oversized pitch of the chain (.3752) and the real oversized pitch of the sprocket (.3756) to relieve interference action between the chain teeth and sprocket teeth at entrance and leaving of the sprocket. This design forces the chain teeth outwardly with respect to the sprocket teeth so that the chain rides on the sprocket at a pitch diameter or operating pitch greater than the normal theoretical pitch diameter at which it would normally ride in a chain and sprocket combination of conventional design. In normal design, with perfect matching of the chain and sprocket pitch, the circular pitch of the sprocket is equal to the linear pitch of the chain due to the rocker action in the chain. In this improved design the circular pitch of the sprocket is greater than the linear pitch of the chain.

In normal matched design the practice is to make the sprocket base pitch C and chain base pitch D equal to each other or the same. In this improved design the sprocket base pitch C is made greater than the increased chain base pitch B. To further improve the meshing action, the sprocket tooth pressure angle is made less than the chain tooth pressure angle. Thus, if the chain tooth pressure angle is a standard 25 degress, the sprocket pressure angle is made less than 25 degrees.

By using a greater base pitch in the sprocket than in the chain, the top of the sprocket tooth is made thicker relative to the bottom of the sprocket tooth than in conventional practice such that the contact point of the chain on the sprocket is moved radially outwardly from the location of the contact point of a chain and sprocket of normal design wherein the chain base pitch and sprocket base pitch are equal. Thus, the actual operating pitch of the mismatched chain and sprocket pitches as disclosed herein results in increasing the operating pitch D to a greater pitch than the operating pitch E of a conventional chain and sprocket wherein the chain base pitch and sprocket base pitch are equal.

Figure 5:
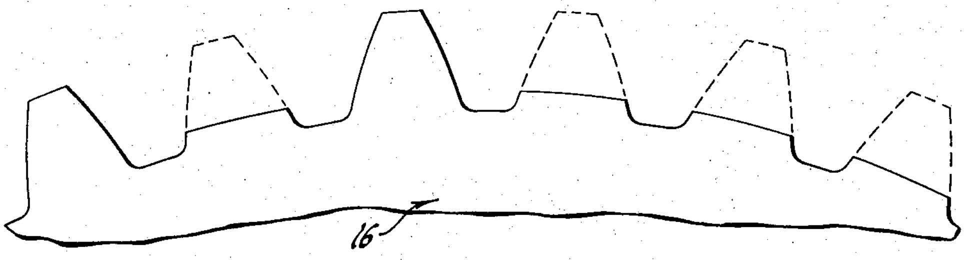
FIGURE 5 is a diagram of a modified sprocket having randomly-spaced full length teeth separated by teeth of relatively short length.

As shown in FIGURES 3 and 5, the driven sprocket 16 is made different from the driving sprocket 14 in that the driven sprocket is made up of a series of unequally spaced teeth of normal length disposed at random spacing with respect to each other and with a series of relatively short teeth intermediate the teeth of normal length and cut off to be of lesser length than the length of the teeth of normal length. The cut off tooth portions are shown by dotted lines in FIGURE 5. In addition, in the driven sprocket 16, root contact of the chain and sprocket teeth is employed to guide the teeth into and out of meshing relationship. One advantage of root guiding or root tooth contact is that it readily accommodates itself to, and permits a greater mismatch of the base chain pitch and sprocket base pitch than does the tooth engagement wherein the meshing tooth action arises as a result of guiding of the teeth by contact of the tooth flanks. The relatively short teeth are cut off so that the remaining profile of such teeth never touches the rocking action portion of the chain. The roots of the sprocket teeth contact the tips of the chain teeth to introduce random impulses out of phase from any natural frequency impulses. For a normal chain pressure angle (25°) there is a normal base circle on the sprocket. In the present design the diameter of the actual operating base pitch circle of the sprocket is increased over the normal base pitch circle to decrease the sprocket pressure angle, such that the sprocket pressure angle is again less than the chain pressure angle as was true of the drive sprocket 14. The base pitch of the chain is made less than the base pitch of the sprocket teeth.

The random distribution of the full length teeth of the driven sprocket prevents resonant frequencies from being established, further contributing to quiet operation of the chain drive. It has been found that in the event that the full length teeth are equally spaced from each other a uniform frequency beat is established and the assembly is noisy. By spacing the full length teeth at random as shown, this noise is eliminated. In FIGURE 3, seven full length teeth F are shown.

The present design incorporating the features herein disclosed produces a chain drive wherein the noise level is reduced to such an extent as to make the chain practical and acceptable for use in applications wherein the noise level is a critical problem as in the drive of an automobile transmission. In addition, the present design greatly increases chain life to a figure which renders the chain practical in applications such as automotive drive trains. Chains of conventional design have been found to be unacceptable in automotive drive trains as described both because of high objectionable noise and relatively short chain life.

Figure 4:
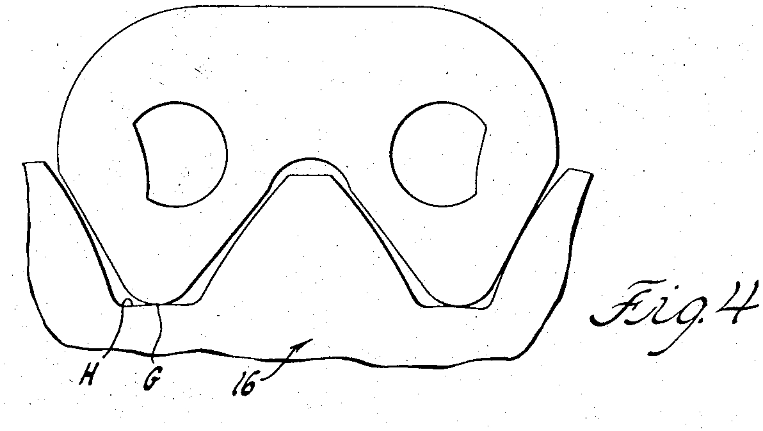
FIGURE 4 is a side view of a modified chain and sprocket constructed and arranged to provide root guide of the chain on the sprocket during rocking motion of the chain relative to the sprocket.

The root guiding of the chain and driven sprocket is further illustrated in FIGURE 4 showing the meshing action of the chain and one full length tooth. As shown, the tips G of the chain teeth contact the root H of the sprocket teeth such that the chain pitch line or operating pitch of the chain on the sprocket is controlled by contact with the root of the sprocket teeth rather than by contact of the flanks of the chain and sprocket teeth. By using root diameter contact, a larger operating circular pitch on the sprocket than the actual chain pitch may be obtained. If desired, the root diameter contact may also be used to insure that the circular pitch of the sprocket is equal to the linear pitch of the chain. The root guide method of positioning the links on the sprocket is of advantage over the conventional flank guide method because direct dimensions on the functioning parts control the operating pitch diameter. The root diameter dimension on the sprocket is much more easily controlled than the conventional roll dimension, particularly on involute surfaces and which becomes increasingly difficult to control as the pressure angle of the sprocket teeth is lowered. The driving contact of the chain and sprocket flanks occurs after rocking motion of the chain relative to the sprocket has substantially ceased, thereby reducing flank shock and noise.

Figure 6:
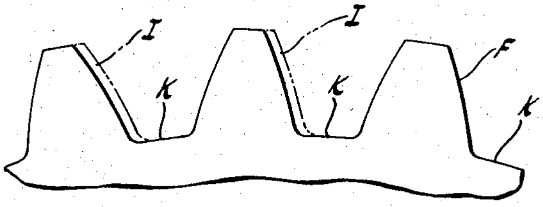
FIGURE 6 is a diagram of a modified sprocket employing randomly-spaced full sized teeth separated by additional full length teeth having the flanks shaved away.

FIGURE 5 is a schematic diagram of a sprocket formed to accommodate root diameter control of the operating pitch of a link chain. The sprocket 16 is initially formed to provide a full complement of full length teeth in the conventional manner. After forming, certain of the teeth are cut away such that the remaining full length teeth are spaced from each other in a random irregular pattern. The flanks of the short teeth normally will engage the flanks of the chain teeth only when the chain has wrapped on the sprocket to an extent such that rocking motion of the chain on the sprocket has ceased. Thus chain speed and sprocket speed are substantially equal at the time that flank contact of the chain and sprocket teeth occurs. However, in the event that the chain load is sufficient to stretch the chain the amount of the tooth relief, the relieved flanks, as shown in FIGURE 6, will have contact with the chain. The cut away portions of the sprocket teeth are illustrated by the dotted lines, there being two full length teeth shown.

In FIGURE 6, there is shown an alternate method of forming the sprocket teeth to accommodate root guiding of the chain teeth onto the sprocket. In this method all of the sprocket teeth are formed initially as full length teeth as was the case in FIGURE 4. Here, however, certain sprocket teeth have their flanks sheared off to render the teeth inactive during rolling motion of the chain relative to the sprocket. Those teeth of normal size and profile will be spaced at random with respect to each other and will be full sized teeth. The advantage of this method of forming the sprocket is that one full profile F may be used for guiding purposes during grinding indexing. The portion of the tooth flank cut away is illustrated by the dotted line I.

Figure 7:
FIGURE 7 is a diagram of a modified sprocket having randomly spaced full sized teeth separated by spacer teeth wherein the flanks and roots of the spacer teeth are cut away.

In FIGURE 7, there is shown a modification of a sprocket such as shown in FIGURE 6 wherein not only are the flanks of the inactive teeth cut away as indicated at I, but the root between the inactive teeth is also cut away as indicated at J. Thus, after forming a sprocket having uniform full sized teeth, both the flank and root of the teeth which are to be rendered inactive during rocking motion of the chain on the sprocket are cut away as shown in section and by the dot-dash line. Full teeth F having a full root K are spaced from each other at random. This arrangement of random root guiding of the chain on the sprocket wherein the full sized teeth and the root associated therewith for guiding the chain teeth are spaced at random from each other accentuates the effect of the random tooth action of the type illustrated in FIGURE 4. It will be understood in FIGURE 4 that the roots of all the teeth are full size, whereas in FIGURE 7, only the random full sized teeth are provided with a full sized root. With the random distribution of the full sized teeth and full sized roots as illustrated in FIGURE 7, a random pulse will be introduced to the polygon action of the chain as it wraps on the sprocket. This arrangement is preferred over the FIGURE 6 arrangement in that both the random full sized teeth and random full sized roots serve to prevent resonant frequencies from being established in operation. In FIGURE 7, the flanks on each of the full length teeth intermediate the randomly spaced full sized teeth are initially formed full size the same as the flank F of the full sized teeth. The flanks I and the roots J, however, are shaved away to make the flanks I inactive during rocking motion of the chain on the sprocket. In like manner the roots J are shaved away to provide roots of reduced diameter as compared to the normally formed root K full sized tooth. This arrangement of the random roots K of full size will accentuate the effect of the random full sized teeth F by introducing a random pulse to the polygonal action of the chain during rocking motion of the chain relative to the sprocket, further decreasing the noise level of the assembly, providing an additional system to produce random pulse generation having a full complement of full size teeth on both sprockets with random spaced relieved roots on one or both sprockets.

What is claimed is:

1. Drive transmitting mechanism comprising first and second sprockets rotatable about axes spaced from each other a fixed sprocket center distance, upstanding sprocket teeth on each of said sprockets, a chain for transmitting torque between said sprockets, said chain including a plurality of pivotally interconnected links and having teeth adapted to mesh with said sprocket teeth, the base pitch of said chain being greater than that required for perfect matching of said chain teeth and sprocket teeth, the base pitch of sprocket teeth of at least one of said sprockets being greater than the base pitch of said chain.

2. Drive transmitting mechanism as set forth in claim 1 wherein the base pitch of said chain is greater than the pitch normally required for perfect match of said chain and sprocket teeth such that the length of said chain between said sprocket centers is greater than said sprocket center distance, the base pitch of said sprocket teeth on both of said sprockets being greater than the base pitch of said chain teeth.

3. Drive transmitting mechanism comprising first and second sprockets rotatable about axes spaced a predetermined sprocket center distance from each other, sprocket teeth on each of said sprockets, a chain having chain teeth for coacting with the teeth of each of said sprockets, said chain having links the base pitch of which is greater than the pitch of a link designed for perfect chain tooth and sprocket tooth match whereby the linear length of said chain between the sprocket centers in a static condition of said chain is greater than said sprocket center distance, the base pitch of said sprocket teeth of each of said sprockets being greater than the base pitch of said chain links whereby the operating pitch of said chain on both of said sprockets is greater than the operating pitch of a chain designed for perfect matching of the chain and sprocket teeth.

4. Drive transmitting mechanism as set forth in claim 3 wherein said chain is provided with pivotally interconnected toothed links, said links having a base pitch greater than the normal base pitch required to provide a perfect match with said sprocket teeth, said chain link teeth having flanks of a predetermined pressure angle and said sprocket teeth having a base pitch greater than the base pitch of said chain links and a pressure angle less than the pressure angle of said link teeth, the operating pitch of said chain on said sprockets being greater than the normal operating pitch of sprockets and chains wherein the sprocket base pitch and chain base pitch are equal.

5. Drive transmitting structure as set forth in claim 3 wherein the length of the majority of the teeth on at least one of said sprockets is reduced such that the flanks of the relatively short teeth are initially spaced from the flanks of the chain link teeth during rocking motion of the chain links relative to the sprocket and the chain link teeth contact the flanks of the relatively short sprocket teeth only upon cessation of rocking motion of the links relative to said sprocket, said one sprocket having a portion of said sprocket teeth of normal length for contacting said chain link teeth.

6. Drive transmitting mechanism comprising first and second sprockets supported for rotation about sprocket centers spaced from each other a fixed sprocket center distance, sprocket teeth on each of said sprockets, a link chain having pivoted links and chain teeth for transmitting torque between said sprockets, the base pitch of said links being greater than the base pitch normally required for perfect matching of said link and sprocket teeth such that the length of said chain between said sprocket centers in the static condition of said chain is greater than said fixed sprocket center distance, the base pitch of sprocket teeth of both of said sprockets being greater than the increased link pitch whereby the operating pitch of said chain on said sprockets is greater than that of conventional chains designed to have the link pitch and sprocket tooth base pitch equal to each other, one of said sprockets having a full complement of equally spaced teeth of full normal length and providing flank contact of the flanks of said chain link teeth and said sprocket teeth during rolling action of said link on said sprocket, the other said sprockets having a multiplicity of relatively short teeth displaced in spaced groups and having a tooth of relatively long length disposed intermediate each of said groups of relatively short teeth, said relatively long teeth being spaced at unequal distances with respect to each other in a random pattern, the flanks of said short teeth being initially spaced from the flanks of said chain teeth during rocking motion of said chain with respect to said last-mentioned sprocket to provide an initial gap between said sprocket flanks and chain tooth flanks, said gap becoming increasingly narrower as the rocking motion of the chain with respect to said sprocket decreases, the flanks of said relatively short teeth being in contact with the flanks of said chain teeth only when the rocking motion of said chain with respect to said last-mentioned sprocket terminates, the tip of said chain teeth contacting the root of said relatively short teeth during rocking motion of said chain to guide said chain teeth onto said relatively short sprocket teeth.

7. Drive transmitting mechanism comprising first and second sprockets rotatable about sprocket centers spaced from each other a fixed sprocket center distance, said first sprocket comprising a sprocket hub and a sprocket mounted on said hub for limited angular rotation with said hub, a bearing surface on said hub supporting said sprocket on said hub for such limited angular rotation, coacting torque transmitting splines for transmitting torque between said hub and said first sprocket, torsional damping means between said hub and sprocket normally positioning said sprocket and hub to maintain said splines out of metal-to-mental contact with each other when the sprocket is relieved of load, sprocket teeth on each of said sprockets, a link chain having chain teeth coacting with the teeth on said sprockets, the base pitch of said chain links being greater than that required for perfect matching of said chain teeth and sprocket teeth whereby the length of said chain between said sprocket centers is greater than said fixed sprocket center distance in the static condition of said chain, the sprocket base pitch of said sprocket teeth of both of said sprockets being greater than the base pitch of said chain links.

8. Drive transmitting mechanism comprising first and second sprockets rotatable about axes spaced from each other a fixed sprocket center distance, sprocket teeth on said sprockets, a link chain for transmitting drive between said sprockets having a plurality of pivotally interconnected links and having teeth adapted to mesh with said sprocket teeth, said chain having a base pitch greater than that required for perfect mesh of said sprocket and chain teeth, the base pitch of said sprocket teeth being greater than the base pitch of said chain, said chain being rocked relative to said sprockets during initial wrapping of said chain on said sprockets, at least one of said sprockets having full sized teeth spaced from each other at random and teeth of reduced size intermediate said full sized teeth, said chain teeth having the tips thereof adapted to contact the roots of said full sized randomly spaced full sized teeth to guide said chain on said one sprocket during rocking motion of said chain relative to said sprocket, the flanks of said chain teeth and sprocket teeth being spaced from each other during rocking motion of said chain and being in contact with each other upon cessation of such rocking motion.

9. Drive transmitting mechanism as set forth in claim 8 including a hub for supporting one of said sprockets, and having a torsional damper disposed between said hub and sprocket for permitting limited angular rotation of said sprocket relative to said hub, said damper being effective to isolate sprocket tooth engagement pulses and to prevent excitation of critical resonant frequencies to minimize noise.

10. Drive transmitting mechanism as set forth in claim 8 including a hub for supporting one of said sprockets, coacting spline on said hub and sprocket, a raised bearing surface on said hub supporting said sprocket for limited angular rotation of said splines relative to each other, a torsional damper carried by said hub and contacting said sprocket for isolating sprocket tooth engagement pulses and preventing critical resonant frequencies from developing in the sprocket mounting system.

11. Drive transmitting mechanism comprising first and second sprockets rotatable about axes spaced from each other a fixed sprocket center distance, sprocket teeth on each of said sprockets, a chain for transmitting drive between said sprockets and having teeth for coacting with said sprocket teeth, the pitch of said chain being greater than the pitch required for perfect matching of said chain and sprocket teeth whereby the length of said chain with the chain at rest on said sprockets is greater between said sprocket centers than said sprocket center distance, the base pitch of said sprocket teeth being greater than the pitch of said chain, at least one of said sprockets having full sized teeth spaced from each other at random and the remainder of the sprocket teeth formed of reduced size relative to said full size teeth such that the flanks of said chain teeth and reduced size sprocket teeth are initially spaced from each other during rocking motion of the chain relative to the sprocket, the flanks of the chain teeth contacting the flanks of the reduced size sprocket teeth when the rocking motion of the chain relative to the sprocket has ceased.

12. Drive transmitting mechanism comprising first and second sprockets rotatable about axes spaced from each other a fixed sprocket center distance, sprocket teeth on each of said sprockets, a toothed chain for transmitting drive between said sprockets, the pitch of said chain being greater than that required for perfect match of said chain and sprocket teeth whereby the length of said chain between said sprocket centers is greater than said sprocket center distance when said chain is at rest, the base pitch of said sprocket teeth being greater than said chain pitch, at least one of said sprockets having a plurality of full sized teeth each with a full sized root spaced from each other at random, the remainder of said sprocket teeth of said one sprocket being formed of reduced size and the roots of said reduced sized teeth being of reduced size compared to said full sized teeth and roots, respectively, whereby the flanks of said chain teeth and the flanks of said reduced size sprocket teeth are initially spaced from each other during rocking action of said chain on said sprocket, the flanks of said chain teeth and the flanks of said reduced sized sprocket teeth being in contact only upon cessation of said rocking motion of said chain relative to said sprocket, said chain teeth being guided upon said sprocket teeth by contact of the tips of said chain teeth and the roots of said sprocket teeth.

13. Drive transmitting mechanism comprising first and second sprockets rotatable about axes spaced from each other a fixed sprocket center distance, sprocket teeth on each of said sprockets, a link chain having pivoted links and having teeth adapted to engage said sprocket teeth, the base pitch of said chain being greater than that required for perfect matching of said chain and sprocket teeth whereby with said chain at rest the length of said chain between said sprockets is greater than said sprocket center distance, the base pitch of said sprocket teeth being greater than said chain base pitch, said chain initially engaging said sprocket with a rocking motion relative to said sprocket, at least one of said sprockets having randomly disposed full-sized teeth and having teeth of reduced size intermediate said randomly disposed full sized teeth, said chain teeth contacting the roots of said full sized teeth for guiding said chain teeth on said sprocket teeth and the flanks of said chain teeth and the flanks of said sprocket teeth being spaced from each other during rocking motion of said chain relative to said sprocket, said chain teeth flanks and said sprocket teeth flanks being in contact with each other upon completion of the rocking motion of the chain relative to said sprocket.

14. Drive transmitting mechanism comprising first and second sprockets rotatable about axes spaced from each other a fixed sprocket center distance, a full complement of full sized teeth on both of said sprockets, the teeth of at least one of said sprockets being formed to include random spaced relieved roots and teeth having unrelieved roots, a chain for transmitting torque between said sprockets, said chain including a plurality of pivotally interconnected links adapted to mesh with said sprocket teeth, the tips of said chain teeth contacting only the unrelieved roots of said sprocket teeth for guiding said chain teeth into mesh with said sprocket teeth.

References Cited

UNITED STATES PATENTS

| | | | |
|---|---|---|---|
| 1,297,835 | 3/1919 | Guay | 74—443 XR |
| 2,056,602 | 10/1936 | Dull et al. | 74—250 |
| 2,667,791 | 2/1954 | Bremer | 74—245 |
| 2,888,833 | 6/1959 | Toderick | 75—434 |
| 3,206,997 | 9/1965 | Hardy | 74—443 XR |
| 3,237,475 | 3/1966 | Mattson et al. | 74—457 |
| 3,241,392 | 3/1966 | Hardy | 74—443 XR |

FRED C. MATTERN, Jr., *Primary Examiner.*

J. A. WONG, *Assistant Examiner.*